(12) United States Patent
Wu et al.

(10) Patent No.: US 12,223,936 B2
(45) Date of Patent: Feb. 11, 2025

(54) METHOD FOR SYNTHESIZING VIDEO, TERMINAL AND STORAGE MEDIUM

(71) Applicant: GUANGZHOU KUGOU COMPUTER TECHNOLOGY CO., LTD., Guangzhou (CN)

(72) Inventors: Han Wu, Guangzhou (CN); Wentao Li, Guangzhou (CN)

(73) Assignee: Guangzhou Kugou Computer Technology Co., Ltd., Guangzhou (CN)

( * ) Notice: Subject to any disclaimer, the term of this patent is extended or adjusted under 35 U.S.C. 154(b) by 741 days.

(21) Appl. No.: 17/593,238

(22) PCT Filed: Nov. 22, 2019

(86) PCT No.: PCT/CN2019/120292
§ 371 (c)(1),
(2) Date: Sep. 13, 2021

(87) PCT Pub. No.: WO2020/253096
PCT Pub. Date: Dec. 24, 2020

(65) Prior Publication Data
US 2022/0157285 A1    May 19, 2022

(30) Foreign Application Priority Data
Jun. 21, 2019 (CN) .......................... 201910544048.1

(51) Int. Cl.
*G10H 1/36* (2006.01)
*G10H 1/00* (2006.01)
(Continued)

(52) U.S. Cl.
CPC ........... *G10H 1/368* (2013.01); *G10H 1/0025* (2013.01); *G10H 1/40* (2013.01); *H04N 5/265* (2013.01)

(58) Field of Classification Search
CPC ........ G10H 1/368; G10H 1/0025; G10H 1/40; H04N 5/265
(Continued)

(56) References Cited

U.S. PATENT DOCUMENTS

| 9,111,519 B1* | 8/2015 | Yang | G10H 1/40 |
| 2004/0054542 A1* | 3/2004 | Foote | G09B 7/00 |
| | | | 704/E21.02 |

(Continued)

FOREIGN PATENT DOCUMENTS

| CN | 104103300 A | 10/2014 |
| CN | 105072354 A | 11/2015 |

(Continued)

OTHER PUBLICATIONS

Office Action in Chinese application No. 201910544048.1 issued on Mar. 3, 2022, which is foreign counterpart application of this US application.
(Continued)

*Primary Examiner* — Christina M Schreiber
(74) *Attorney, Agent, or Firm* — Knobbe, Martens, Olson, & Bear, LLP

(57) ABSTRACT

A method for synthesizing a video includes: acquiring audio data and dotting data corresponding to the audio data, the dotting data including a beat time point and a beat value corresponding to the beat time point of the audio data; acquiring a plurality of material images from a local source; and synthesizing, based on the dotting data, the plurality of material images and the audio data to acquire a synthesized video, a switching time point of each of the material images in the synthesized video being the beat time point of the audio data.

15 Claims, 11 Drawing Sheets

(51) Int. Cl.
*G10H 1/40* (2006.01)
*H04N 5/265* (2006.01)

(58) Field of Classification Search
USPC .......................................................... 84/610
See application file for complete search history.

(56) References Cited

U.S. PATENT DOCUMENTS

| | | | | |
|---|---|---|---|---|
| 2017/0263228 | A1* | 9/2017 | Silverstein | G10L 25/15 |
| 2021/0249052 | A1* | 8/2021 | Guo | G11B 27/031 |
| 2022/0157285 | A1* | 5/2022 | Wu | G10H 1/0025 |
| 2023/0290382 | A1* | 9/2023 | Feng | G10H 1/368 |

FOREIGN PATENT DOCUMENTS

| | | | | | |
|---|---|---|---|---|---|
| CN | 105227864 | A | | 1/2016 | |
| CN | 105550251 | A | | 5/2016 | |
| CN | 107393569 | A | | 11/2017 | |
| CN | 107483843 | A | | 12/2017 | |
| CN | 107770457 | A | | 3/2018 | |
| CN | 108419035 | A | * | 8/2018 | |
| CN | 109379643 | A | | 2/2019 | |
| CN | 110233976 | A | | 9/2019 | |
| CN | 110336960 | A | * | 10/2019 | G10H 1/40 |
| CN | 110602552 | A | * | 12/2019 | H04N 21/4398 |
| CN | 110602552 | B | * | 2/2022 | H04N 21/4398 |
| WO | WO-2020253096 | A1 | * | 12/2020 | G10H 1/0025 |
| WO | WO-2021008055 | A1 | * | 1/2021 | G10H 1/40 |

OTHER PUBLICATIONS

International Search Report and Written Opinion of PCT Patent Application No. PCT/CN2019/120292—18 pages (Mar. 27, 2020).
First Office Action of Chinese Patent Application No. 201910544048.1—20 pages (Feb. 1, 2021).
Chao Weng, "Research on the Digital Video/Audio Splitting and Merging Technology", Excellent master's thesis, School of Electronics and Electrical Engineering, Shanghai Jiao Tong University—85 pages (Jan. 1, 2010).

* cited by examiner

METHOD FOR SYNTHESIZING VIDEO, TERMINAL AND STORAGE MEDIUM

CROSS-REFERENCE TO RELATED APPLICATION

This application is a US national phase application based on PCT/CN2019/120292, filed on Nov. 22, 2019, which claims priority to Chinese Patent Application No. 201910544048.1, filed on Jun. 21, 2019 and entitled "METHOD AND APPARATUS FOR VIDEO SYNTHESIS, TERMINAL AND STORAGE MEDIUM" the entire content of which is incorporated herein by reference.

TECHNICAL FIELD

The present disclosure relates to the field of video processing technologies, and in particular relates to a method and apparatus for synthesizing a video, and a terminal and a storage medium thereof.

BACKGROUND

In daily life, many people may take and save photos of their interested things and share these photos, or may take photos when intending to share their daily life. However, sharing merely the pictures or videos seems to be monotonous.

At present, people typically simply piece together the pictures or videos taken as material images to synthesize a video to be shared, select a piece of music suitable for an image or video scene as background music to be added to the video, and then share the video.

In the process of implementing the present disclosure, the inventors have found the following problems in the related art.

Although the background music is added as described in the related art, the background music and the material images are not associated with each other. The effect achieved by the related art is the same as playing a piece of music while playing a video, which does not satisfy the needs of users. Therefore, a method capable of generating a video by combining material images and music is urgently desired.

SUMMARY

Embodiments of the present disclosure provide a method and apparatus for synthesizing a video, and a terminal and a storage medium thereof, which can generate a video by combining material images and audio data. The technical solutions are as follows.

In a first aspect, a method for synthesizing a video is provided. The method includes:
acquiring audio data and dotting data corresponding to the audio data, wherein the dotting data includes a beat time point and a beat value corresponding to the beat time point in the audio data;
acquiring a plurality of material images from a local source; and
synthesizing, based on the dotting data, the plurality of material images and the audio data to acquire a synthesized video, wherein a switching time point of each of the material images in the synthesized video is the beat time point of the audio data.

Optionally, synthesizing, based on the dotting data, the plurality of material images and the audio data to acquire the synthesized video includes:
determining a synthesis sequence of the material images during video synthesizing;
determining, based on the synthesis sequence of the material images, the dotting data and the material image, a sub-video corresponding to each of the material images; and
synthesizing, based on the synthesis sequence, each of the sub-videos to acquire synthesized image data, and synthesizing the synthesized image data and the audio data to acquire the synthesized video.

Optionally, determining, based on the synthesis sequence of the material images, the dotting data and the material image, the sub-video corresponding to each of the material images includes:
acquiring, based on the synthesis sequence of the material images, the material images one by one, and each time one material image is acquired, determining, based on the currently acquired material image and the dotting data, the sub-video corresponding to the currently acquired material image.

Optionally, determining, based on the currently acquired material image and the dotting data, the sub-video corresponding to the currently acquired material image includes:
in response to the currently acquired material image being a material picture and the material picture being the first to be synthesized, determining a first duration from a start time point of the audio data to a first beat time point of the audio data, and generating, based on the material picture and the first duration, a first sub-video corresponding to the material picture, wherein all video frames in the first sub-video are the material picture; and
in response to the material pictures being not the first to be synthesized, determining a first total duration of the generated sub-video, determining a first time point of the first total duration upon the start time point of the audio data, determining a first beat time point upon the first time point and closest to the first time point, determining a second duration from the first time point to the first beat time point, and generating, based on the material picture and the second duration, a second sub-video corresponding to the material picture, wherein all video frames in the second sub-video are the material picture.

Optionally, determining the first beat time point upon the first time point and closest to the first time point includes:
in response to no first beat time point being defined between the first time point and an end time point of the audio data, adding the audio data at the end of the audio data to acquire the added audio data, and determining, in the added audio data, the first beat time point upon the first time point and closest to the first time point.

Optionally, determining, based on the currently acquired material image and the dotting data, the sub-video corresponding to the currently acquired material image includes:
in response to the currently acquired material image being a material video and the material video being the first to be synthesized, determining a second time point of a preset duration upon a start time point of the audio data, and determining a total duration of the material video minus the preset duration as a third duration; in response to at least one third beat time point of which a corresponding beat value is a preset value being defined in the third duration upon the second time point, determining the third beat time point closest to the second time point, determining a fourth duration from the start time point of the audio data to the third beat, time point closest to the second time point, and intercepting, in the material video, a video of the fourth duration from the start time point of the material video as a third sub-video corresponding to the material video; and in response to no third beat time point of which the corresponding beat value is the preset value being defined in the third duration upon the second time point, determining a fourth beat time point which is closest to the second time point and of which a corresponding beat value is the preset value between the start time point of the audio data and the second time point, determining a fifth duration from the start time point of the audio data to the fourth beat time point, and intercepting, in the material video, a video of the fifth duration from the start time point of the material video as a fourth sub-video corresponding to the material video; and in response to the material video being not the first to be synthesized, determining a second total duration of the generated sub-video, determining a third time point of the second total duration upon the start time point of the audio data, determining a fourth time point of the preset duration upon the third time point, and determining the total duration of the material video minus the preset duration as a sixth duration; in response to at least one fifth beat time point of which a corresponding beat value is the preset value being defined in the sixth duration upon the fourth time point, determining the fifth beat time point closest to the fourth time point, determining a seventh duration from the third time point to the fifth beat time point closest to the fourth time point, and intercepting, in the material video, a video of the seventh duration from the start time point of the material video as a fifth sub-video corresponding to the material video; and in response to no fifth beat time point of which the corresponding beat value is the preset value being defined in the sixth duration upon the fourth time point, determining a sixth beat time point which is closest to the fourth time point and of which a corresponding beat value is the preset value between the third time point and the fourth time point, determining an eighth duration from the third time point to the sixth beat time point closest to the fourth time point, and intercepting, in the material video, a video of the eighth duration from the start time point of the material video as a sixth sub-video corresponding to the material video.

Optionally, the method further includes:
in response to no beat time point of which the corresponding beat value is the preset value being defined upon the third time point, adding the audio data to the end of the audio data, determining the fourth time point of the preset duration upon the third time point, and determining t the total duration of the material video minus the preset duration as the six duration; in response to at least one fifth beat, time point of which the corresponding beat value is the preset value being defined in the sixth duration upon the fourth time point, determining the fifth beat time point closest to the fourth time point, determining the seventh duration from the third time point to the fifth beat time point closest to the fourth time point, and intercepting, in the material video, the video of the seventh duration from the start time point of the material video as the fifth sub-video corresponding to the material video; and in response to no fifth beat time point of which the corresponding beat value is the preset value being defined in the sixth duration upon the fourth time point, determining the sixth beat time point which is closest to the fourth time point and of which the corresponding beat value is the preset value before the fourth time point, determining the eighth duration from the third time point to the sixth beat time point closest to the fourth time point, and intercepting, in the material video, the video of the eighth duration from the start time point of the material video as the sixth sub-video corresponding to the material video.

Optionally, the method further includes:
in response to the currently acquired material image being a clipped video, determining the material video as a corresponding seventh sub-video.

Optionally, acquiring the audio data includes:
acquiring original audio data and a preset clipping time point; and
clipping, based on the preset dipping time point, the original audio data to acquire the audio data for synthesizing a video.

Optionally, acquiring the audio data includes:
acquiring the original audio data; and
receiving an audio clip instruction, and clipping, based on the audio clip instruction, the original audio data to acquire the audio data for synthesizing a video.

Optionally, in response to determining, based on the synthesis sequence of the material images, the dotting data and the material image, the sub-video corresponding to each of the material images, the method further includes:
receiving a material image replace instruction, and replacing, based on the material images corresponding to the material image replace instruction, the material images corresponding to a target sub-video; and
determining, based on the synthesis sequence of the replaced material images, the dotting data and each of the replaced material images, the sub-video corresponding to each of the replaced material images.

Optionally, in response to acquiring, based on the synthesis sequence of the material images, the material images one by one, and each time one material image is acquired, determining, based on the currently acquired material image and the dotting data, the sub-video corresponding to the currently acquired material image, the method further includes:
reacquiring, in response to a total duration of the determined sub-videos being less than a duration of the audio data, the material images one by one based on the synthesis sequence of the material images, and each time one material image is acquired, determining, based on the currently acquired material image and the dotting data, the sub-video corresponding to the currently acquired material image.

In a second aspect, an apparatus for synthesizing a video is provided. The apparatus includes:
a first acquiring module, configured to acquire audio data and clotting data corresponding to the audio data, wherein the dotting data includes a beat time point and a beat value corresponding to the beat time point of the audio data;
a second acquiring module, configured to acquire a plurality of material images from a local source; and
a synthesizing module, configured to synthesize, based on the dotting data, the plurality of material images and the audio data to acquire a synthesized video, wherein a switching time point of each of the material images in the synthesized video is the beat time point of the audio data.

Optionally, the synthesizing module is configured to:
determine a synthesis sequence of the material images during video synthesizing;
determine, based on the synthesis sequence of the material images, the dotting data and the material images, a sub-video corresponding to each of the material images; and
synthesize, based on the synthesis sequence, each of the sub-videos to acquire synthesized image data, and synthesize, the synthesized image data and the audio data to acquire the synthesized video.

Optionally, the synthesizing module is configured to:
acquire, based on the synthesis sequence of the material images, the material images one by one, and each time one material image is acquired, determine, based on the currently acquired material image and the dotting data, the sub-video corresponding to the currently acquired material image.

Optionally, the synthesizing module is configured to:
in response to the currently acquired material image being a material picture and the material picture being the first to be synthesized, determine a first duration from a start time point of the audio data to a first beat time point of the audio data, and generate, based on the material picture and the first duration, a first sub-video corresponding to the material picture, wherein all video frames in the first sub-video are the material picture; and
in response to the material pictures being not the first to be synthesized, determine a first total duration of the generated sub-video, determine a first time point of the first total duration upon the start time point of the audio data, determine a first beat time point upon the first time point and closest to the first time point, determine a second duration from the first time point to the first beat time point, and generate, based on the material picture and the second duration, a second sub-video corresponding to the material picture, wherein all video frames in the second sub-video are the material picture.

Optionally, the synthesizing module is configured to:
in response to no first beat time point being defined between the first time point and an end time point of the audio data, add the audio data at the end of the audio data to acquire the added audio data, and determine, in the added audio data, the first beat time point upon the first time point and closest to the first time point.

Optionally, the synthesizing module is configured to:
in response to the currently acquired material image being a material video and the material video being the first to be synthesized, determine a second time point of a preset duration upon the start time point of the audio data, and determine a total duration of the material video minus the preset duration as a third duration; in response to at least one third beat time point of which a corresponding beat value is a preset value being defined in the third duration upon the second time point, determine the third beat time point closest to the second time point, determine a fourth duration from the start time point of the audio data to the third beat time point closest to the second time point, and intercept, in the material video, a video of the fourth duration from the start time point of the material video as a third sub-video corresponding to the material video; and in response to no third beat time point of Which the corresponding beat value is the preset value being defined in the third duration upon the second time point, determine a fourth beat time point which is closest to the second time point and of which a corresponding beat value is the preset value between the start time point of the audio data and the second time point, determine a fifth duration from the start time point of the audio data to the fourth beat time point, and intercept, in the material video, a video of the fifth duration from the start time point of the material video as a fourth sub-video corresponding to the material video; and
in response to the material video being not the first to be synthesized, determine a second total duration of the generated sub-video, determine a third time point of the second total duration upon the start time point of the audio data, determine a fourth time point of the preset duration upon the third time point, and determine the total duration of the material video minus the preset duration as a sixth duration; in response to at least one fifth beat time point of which a corresponding beat value is the preset value being defined in the sixth duration upon the fourth time point, determine the fifth beat time point closest to the fourth time point, determine a seventh duration from the third time point to the fifth beat, time point closest to the fourth time point, and intercept, in the material video, a video of the seventh duration from the start time point of the material video as a fifth sub-video corresponding to the material video; and in response to no fifth beat time point of which the corresponding beat value is the preset value being defined in the sixth duration upon the fourth time point, determine, a sixth beat time point with is closest to the fourth time point and of which a corresponding beat value is the preset value between the third time point and the fourth time point, determine an eighth duration from the third time point to the sixth beat time point closest to the fourth time point, and intercept, in the material video, a video of the eighth duration from the start time point of the material video as a sixth sub-video corresponding to the material video.

Optionally, the apparatus further includes:
an addition module configured to, in response to no beat time point of which the corresponding beat value is the preset value being defined upon the third time point, add the audio data to the end of the audio data, determine the fourth time point of the preset duration upon the third time point, and determine the total duration of the material video minus the preset duration as the six duration; in response to at least one fifth beat time point of which the corresponding beat value is the preset value being defined in the sixth duration upon the fourth time point, determine the fifth beat time point closest to the fourth time point, determine the seventh duration from the third time point to the fifth beat time point closest to the fourth time point, and intercept, in the material video, the video of the seventh duration from the start time point of the material video as the fifth sub-video corresponding to the material video; and in response to no fifth beat time point of which the corresponding beat value is the preset value being defined in the sixth duration upon the fourth time point, determine the sixth beat time point which is closest to the fourth time point and of which the corresponding beat value is the preset value before the fourth time point, determine the eighth duration from the third time point to the sixth beat time point closest to the fourth time point, and intercept, in the material video, the video of the eighth duration from the start time point of the material video as the sixth sub-video corresponding to the material video.

Optionally, the apparatus further includes:

a clipping module, configured to determine, in response to the currently acquired material image being a clipped video, the material video as a corresponding seventh sub-video.

Optionally, the first acquiring module is configured to:

acquire original audio data and a preset clipping time point; and clip, based on the preset clipping time point, the original audio data to acquire the audio data for synthesizing a video.

Optionally, the first acquiring module is configured to:

acquire the original audio data; and receive an audio clip instruction, and clip, based on the audio clip instruction, the original audio data to acquire the audio data for synthesizing a video.

Optionally, the apparatus further includes:

a replacing module, configured to receive a material image replace instruction, and replace, based on the material images corresponding to the material image replace instruction, the material image corresponding to a target sub-video; and determine, based on the synthesis sequence of the replaced material images, the dotting data and each of the replaced material images, the sub-video corresponding to each of the replaced material images.

Optionally, the apparatus further includes:

a third acquiring module, configured to reacquire, in response to a total duration of the determined sub-videos being less than a duration of the audio data, the material images one by one based on the synthesis sequence of the material images, and each time one material image is acquired, determine, based on the currently acquired material image and the dotting data, the sub-video corresponding to the currently acquired material image.

In a third aspect, a terminal is provided. The terminal includes a processor and a memory configured to store at least one instruction, wherein the processor, when loading and executing the at least one instruction, is caused to perform the method for synthesizing the video as defined in the first aspect.

In a fourth aspect, a computer-readable storage medium is provided. The computer-readable storage medium stores at least one instruction, wherein the at least one instruction, when loaded and executed by a processor, causes the processor to perform the method for synthesizing the video as defined in the first aspect.

The technical solutions according to the embodiments of the present disclosure achieve the beneficial effects:

First, the audio data and the dotting data of the audio data are acquired, and the dotting data may include the beat time point and the beat value corresponding to the beat time point in the acquired audio data. Then, the plurality of material images are acquired from a local source. The material images and the audio data are synthesized to acquire the synthesized video based on the dotting data, such that the switching time point corresponding to each of the material images of the synthesized video can be the beat time point in the audio data. In this way, in the case that the synthesized video is played, the part of video corresponding to each of the material images in the synthesized video is to be switched in the case that music is played to the beat time point of a music material. It can be seen that in the synthesized video acquired by the method, the material images can be effectively combined with the music, and higher playability and interest are achieved.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

An embodiment of the present disclosure provides a method for synthesizing a video, and the method may be performed by a terminal. The terminal may be a mobile phone, a tablet computer, and the like. An application program capable of producing a synthesized video is installed in the terminal. The application program capable of producing the synthesized video may be a comprehensive application program with a variety of functions, such as making synthesized video, video recording, video playing, video editing, music playing and live streaming, and may also be a single-function application program with the function of making synthesized video.

In the case that users intend to make the synthesized video from some material images taken by themselves, downloaded from the Internet, or acquired through some other means, the users may open the above application program capable of making the synthesized video and installed on the terminal. Through the application program, the material images to be synthesized and the music to be used are selected, then a synthesize instruction is sent to the application program, and the application program may make the synthesized video according to the method for synthesizing a video in the embodiment of the present disclosure.

Figure 1:
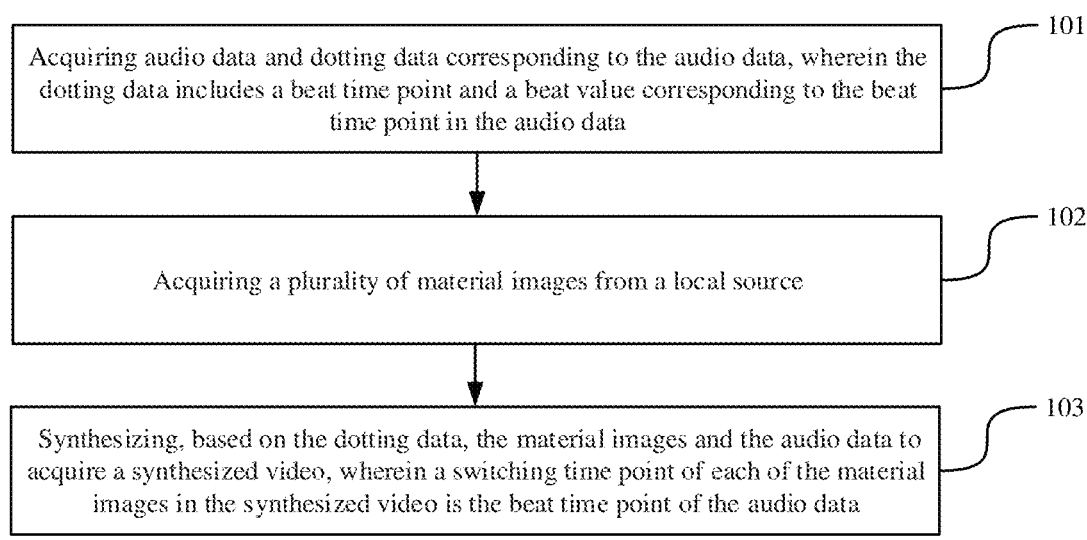
FIG. 1 is a flowchart of a method for synthesizing a video according to an embodiment of the present disclosure.

FIG. 1 is a flowchart of a method for synthesizing a video according to an embodiment of the present disclosure. Referring to FIG. 1, the present embodiment includes the following steps.

In step 101, audio data and dotting data corresponding to the audio data are acquired.

The dotting data includes a beat time point and a beat value corresponding to the beat time point in the audio data. The beat values are generally 1, 2, 3, and 4. The beat value 1 indicates that the beat point is an accent point, and the beat values 2 and 3 indicate that the beat point is a transition point, and the beat value 4 indicates that the beat point is a light point. The beat time point of each of the beat points may be a time point where the rhythm changes in the audio data.

In some embodiments, the user may select the audio data as a background music of the synthesized video prior to making the synthesized video. The application program configured to make the synthesized video may provide the user with a variety of ways to choose the audio data, as illustrated by the following two examples.

Figure 2:
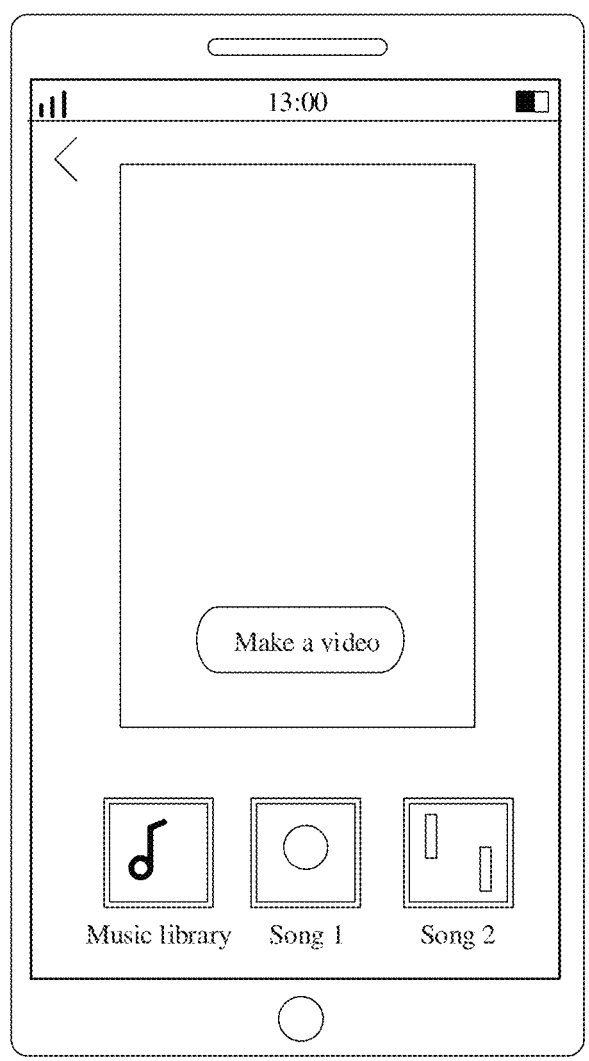
FIG. 2 is a schematic diagram of an interface of an application program according to an embodiment of the present disclosure.

In example 1, the application program may show an interface as shown in FIG. 2 to the user. A music library option and a plurality of music covers are displayed at the bottom of the interface, and a video making option is displayed in the middle of the interface. The user may select the music cover by selecting any music cover at the bottom of the interface and select the video making option, which is equivalent to that the user selects to use the audio data corresponding to the music cover to make the synthesized video. For acquiring the audio data corresponding to the music cover, in the case that the user switches the interface to this interface, the terminal is to acquire the audio data corresponding to all the music covers in the interface from a server, or in response to the user selecting a certain music cover, the terminal may acquire the audio data corresponding to the music cover from the server.

Figure 3:
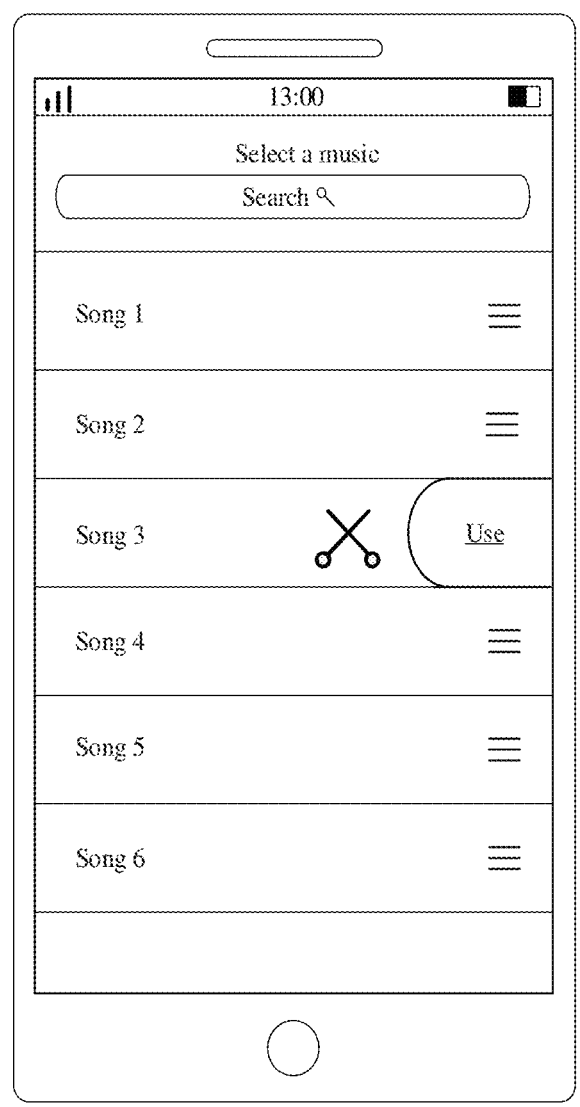
FIG. 3 is a schematic diagram of an interface of an application program according to an embodiment of the present disclosure.

In example 2, as mentioned above, the interface shown in FIG. 2 displayed by the application program to the user displays the music library option. The user may enter a music selection interface as shown in FIG. 3 by selecting the music library option. In the interface as shown in FIG. 3, the user is provided with some selectable music, for example, Song 1 and Song 2, or the like. In addition, a search bar may also be provided to the user, such that the user can search for the music according to the user's preferences. The region with the word "search" at the top of the interface as shown in FIG. 3 is the search bar. The user may download and preview the music by selecting any music bars. A functional option is provided behind each of the music bars. As shown in FIG. 3, an option icon of this functional option is three horizontal lines. In response to the user selecting the functional option, sub-functional options available to the user are to appear, for example, the option icon of the music use function is "use," and the option icon of the music clipping function is scissors-shaped, as shown in FIG. 3. In the case that the user selects the option of music use function corresponding to certain music, the user may click the "use" icon, and then the terminal is to request the audio data of the music from the server.

In the case that the user acquires the audio data in the above mode, and in the case that the server sends the audio data to the terminal, the dotting data corresponding to the audio data may also be sent to the terminal. The server may also send the audio data and the dotting data to the terminal, and a specific sending mode is not limited in the embodiment of the present disclosure.

The beat time point and the corresponding beat value in the dotting data may be generated by a technician using a machine based on beats per minute (BPM) of the audio data, beat information, and the like, or by a technician listening to the audio data and then manually marking the audio data. For the same audio data, the technician may generate both the corresponding manual dotting data and the machine dotting data, which are both saved in the server and are both returned to the terminal in the case that the terminal acquires the dotting data.

Here, it should also be noted that the audio data acquired by the above terminal is original audio data, and the terminal may also clip the original audio data. Several cases in which the terminal clips the original audio data are as follows, In case 1, in addition to sending the audio data and dotting data to the terminal, the server may also send a preset clipping time point to the terminal, and the terminal clips the audio data based on the preset clipping time point to acquire the audio data for synthesizing a video.

The preset clipping time point may be a time point determined by the technician based on a rhythm of the audio data and the like, or may be a climax point in the audio data. The climax point may be manually marked by the technician or collected by the machine, In response to the server sending both of these two preset time points to the terminal, the terminal preferentially selects the time point determined by the technician according to the rhythm of the audio data and the like.

In response to acquiring the preset clipping time point and the original audio data, the terminal intercepts a part between the preset clipping time point and an end time point of the original audio data in the original audio data as the audio data for synthesizing a video.

In case 2, the terminal receives an audio clip instruction, and based on the audio dip instruction, clips the original audio data to acquire the audio data for synthesizing a video.

In the interface shown in the above FIG. 3, each piece of music is to correspond to one option of music clipping function. Upon selection, the user may enter the music clipping interface to clip the original audio data to acquire a required audio data fragment as the audio data for synthesizing a video.

In addition, in the case that the above two cases occur simultaneously, in order to respect the selection of the user more, the terminal may preferentially select the case 2, that is, acquire the audio data for synthesizing a video in response to a music clip instruction of the user. In the case that none of the above cases occurs, the terminal does not need to clip the original audio data, that is, the original audio data is the audio data for synthesizing a video of the user.

In step 102, a plurality of material images are acquired from a local source.

Figure 4:
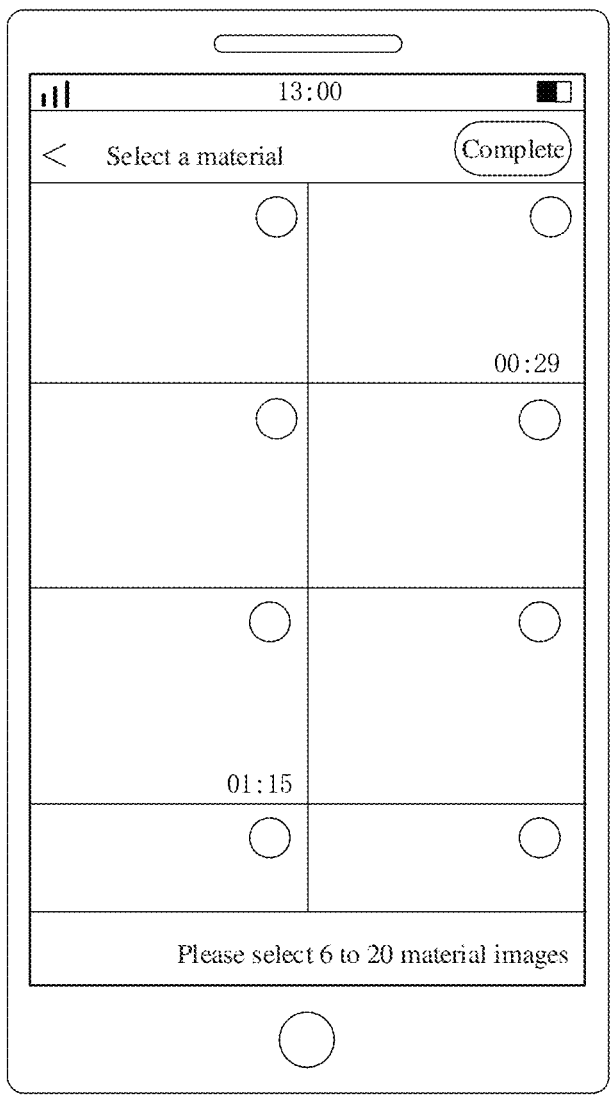
FIG. 4 is a schematic diagram of an interface of an application program according to an embodiment of the present disclosure.

In some embodiments, in response to the audio data being selected, the terminal may select the plurality of material images within a preset number of material images stored from a local source. The interface shown in FIG. 4 is an interface for selecting the material images. Some images stored in the local user terminal are displayed in this interface. The images with a display duration in the lower right corners are videos, and the images without the display duration are pictures. At the lower edge of the interface, there may be a hint about a range of the preset number, for example, "please select 6 to 20 material images" shown in the figure. In response to the user selecting the material images and selects an option of completion, the selection of the material images is finished, and the terminal performs subsequent processes for synthesizing the video.

In step 103, based on the dotting data, the material images and the audio data are synthesized to acquire the synthesized video.

A switching time point of each of the material images in the synthesized video is the beat time point of the audio data.

In some embodiments, the terminal firstly determines a synthesis sequence of the material images selected by the user. In the case that the user selects the material images in the interface as shown in FIG. 4, the material images are selected in sequence. Then, each time the user selects one material image, the terminal may add a synthesis sequence identifier to the material image. The synthesis sequence identifier may be an increasing number. For example, the synthesis sequence identifier corresponding to the material image firstly selected by the user is 1, the synthesis sequence identifier corresponding to the secondly selected material image is 2, and the like. The terminal may determine the corresponding synthesis sequence based on a selection sequence of each of the material images.

Then, based on the synthesis sequence of the material images, the dotting data and the material images, a sub-video corresponding to each of the material images is determined. Finally, the synthesis sequence of the material images is taken as the synthesis sequence of the corresponding sub-video, and each of the sub-videos is synthesized based on the synthesis sequence of the sub-videos. For each of the sub-videos, a switching effect (such as slow-in, fade-in, pop-in and louvered appearance) and a duration of switching effect may be added. The switching effect and the duration of switching effect may be preset by the technician according to actual needs. Then, the sub-videos with the effects are synthesized to acquire synthesized image data. The synthesized image data and the audio data are synthesized to acquire the synthesized video. Here, in response to determining that a duration of the acquired synthesized image data is less than a duration of the audio data, the audio data may be intercepted, the audio data within the duration of the synthesized image data upon a start time point is intercepted, and the intercepted audio data and synthesized image data are synthesized to acquire the synthesized video.

In the case that the sub-video corresponding to each of the material images is determined based on the synthesis sequence of the material images, the dotting data and the material image, the material images may be acquired one by one according to the synthesis sequence of the material images. Each time one material image is acquired, based on the currently acquired material image and the dotting data, the sub-video corresponding to the acquired material image is determined. Several possible implementations of the way to determine the sub-video corresponding to the acquired material image are given as follows.

In one possible implementation, the terminal may firstly select a corresponding number of beat time points in the audio data according to the number of the material images. For example, in the case that the number of the material images is 6, 6 beat time points may be selected. In the case that the material image is the first to be synthesized, the duration of the corresponding sub-video is a duration from the start time point of the audio data to a selected first beat time point, and in the case that the material image is the second to be synthesized, the duration of the corresponding sub-video is a duration from the selected first beat time point to a second beat time point and the like, until the duration of the sub-video corresponding to the material image being the last to be synthesized is determined. According to each of the material images and the duration of corresponding sub-video, the sub-video corresponding to each of the material images is generated. In the case that the material image is a material picture, each frame in the corresponding sub-video is the material image. In the case that the material image is a material video, the corresponding sub-video is part or all of the video clips intercepted in the material image.

Figure 5:
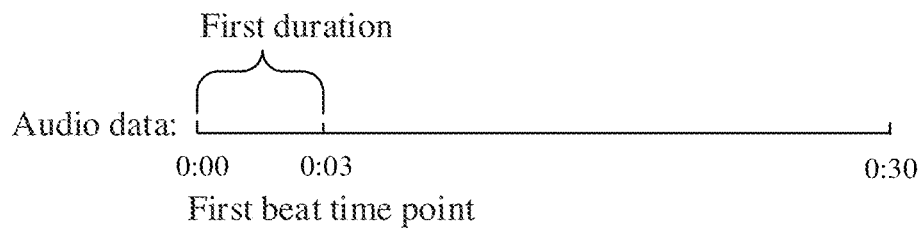
FIG. 5 is a schematic diagram of calculating a duration of a sub-video according to an embodiment of the present disclosure.

In another possible implementation, in the case that the currently acquired material image is the material picture, and the material picture is the first to be synthesized, a first duration from the start time point of the audio data to the first beat time point of the audio data is determined. Based on the material picture and the first duration, a first sub-video corresponding to the material picture is generated. All the video frames in the first sub-video are the material picture. For example, as shown in FIG. 5, the duration of the audio data is 30s, and the start time point of the audio data is 0:00 (zero minute and zero second), the first beat time point in the audio data is 0:03 (zero minute and three seconds), and the first duration is 3s. In this way, based on the material picture and the first duration, a duration of the generated first sub-video is 3 s.

Figure 6:
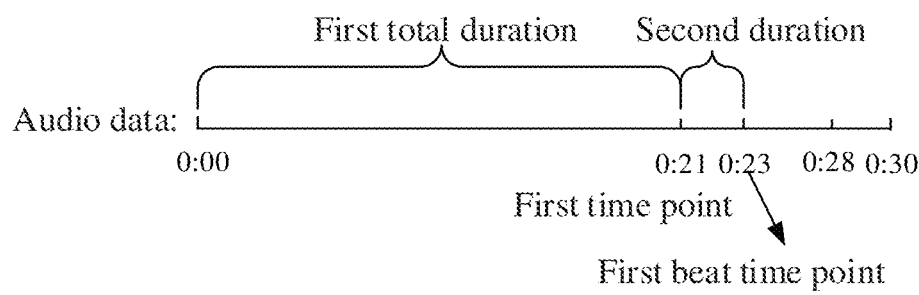
FIG. 6 is a schematic diagram of calculating a duration of a sub-video according to an embodiment of the present disclosure.

In the case that the material pictures are not the first to be synthesized, a first total duration of a generated sub-video is determined, and a first time point of the first total duration upon the start time point of the audio data is determined. The first beat time point upon the first time point and closest to the first time point is determined, and a second duration from the first time point to the first beat time point is determined. Based on the material picture and the second duration, a second sub-video corresponding to the material picture is generated. For example, as shown in FIG. 6, the duration of the audio data is 30 s, and the first total duration of the generated sub-video is 21 s, then the first time point is 0:21, two beat time points between the first time point and an end time point of the audio data are 0:23 and 0:28 respectively. In the case that the first beat time point closest to the first time point is 0:23, the second duration from the first time point to the first beat time point is 2 s. In this way, based on the material picture and the second duration, the duration of the generated second sub-video is 2 s.

Figure 7:
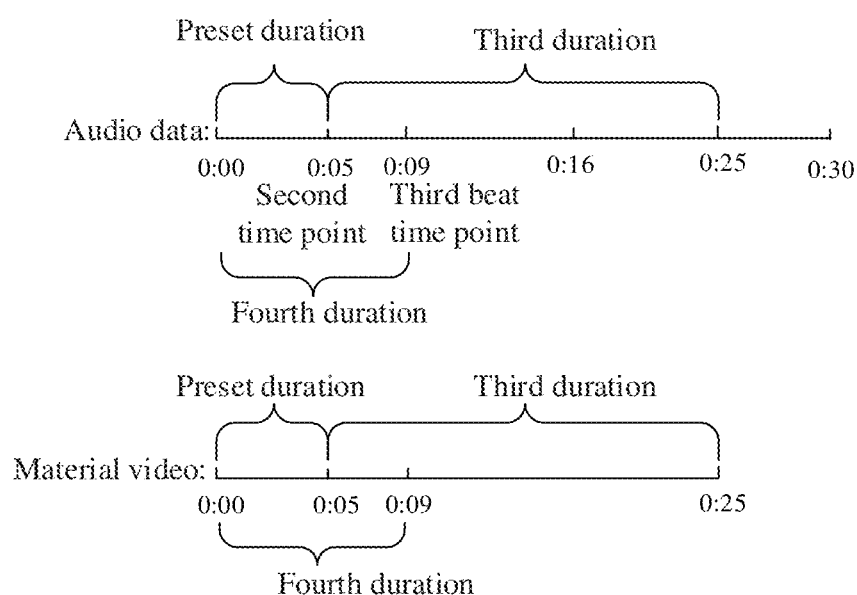
FIG. 7 is a schematic diagram of calculating a duration of a sub-video according to an embodiment of the present disclosure.

In the case that the currently acquired material image is a material video, and the material video is the first to be synthesized, a second time point of a preset duration upon the start time point of the audio data is determined, and a total duration of the material video minus the preset duration is determined as a third duration. In the case that at least one third beat time point of which a corresponding beat value is a preset value is defined in the third duration upon the second time point, the third beat time point closest to the second time point is determined. A fourth duration from the start time point of the audio data to the third beat time point closest to the second time point is determined. In the material video, from the start time point of the material video, a video of the fourth duration is intercepted as a third sub-video corresponding to the material video. For example, as shown in FIG. 7, the duration of the material video is 25 s, and the duration of the audio data is 30 s. The preset duration may be set by the technician according to actual needs, and is, for example, 5 s, then the second time point of the preset duration upon the start time point of the audio data is 0:05, and the duration of the material video minus the preset duration is the third duration of 20 s. In the third duration upon the second time point, there are two third beat time points of which the corresponding beat values are the preset value and which are 0:09 and 0:16 respectively. The third beat time point closest to the second time point is 0:09, and the duration from the start time point to this third beat point is determined as 9 s. In this way, from the start time point of the material video, the video of the fourth duration is intercepted as the third sub-video corresponding to the material video, and a duration of the intercepted third sub-video is 9 s.

Figure 8:
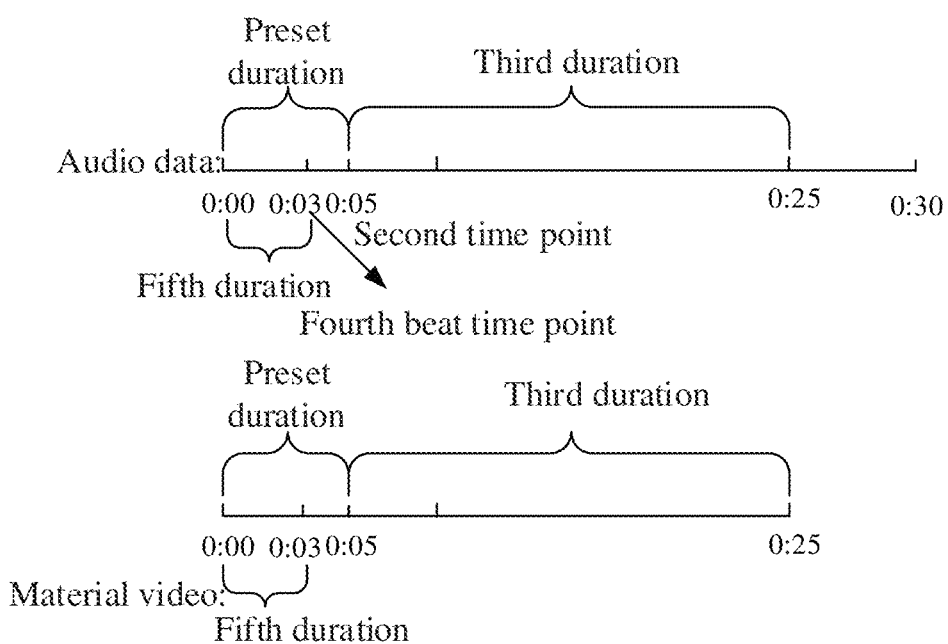
FIG. 8 is a schematic diagram of calculating a duration of a sub-video according to an embodiment of the present disclosure.

In the case that no third beat time point of which the corresponding beat value is the preset value is defined in the third duration upon the second time point, a fourth beat time point which is closest to the second time point and of which a corresponding beat value is the preset value is determined between the start time point of the audio data and the second time point. A fifth duration from the start time point of the audio data to the fourth beat time point is determined, and in the material video, a video of the fifth duration is intercepted from the start time point of the material video as a fourth sub-video corresponding to the material video. For example, as shown in FIG. 8, in the case that no third beat time point of which the corresponding beat value is the preset value is defined in the third duration of the second time point, and the fourth beat time point closest to the second time point is 0:03 between the start time point of the audio data and the second time point, it is determined that the fifth duration from the start time point of the audio data to the fourth beat time point is 3 s. In this way, from the start time point of the material video, the video of the fifth duration is intercepted as the fourth sub-video corresponding to the material video, and a duration of the intercepted fourth sub-video is 3 s.

Figure 9:
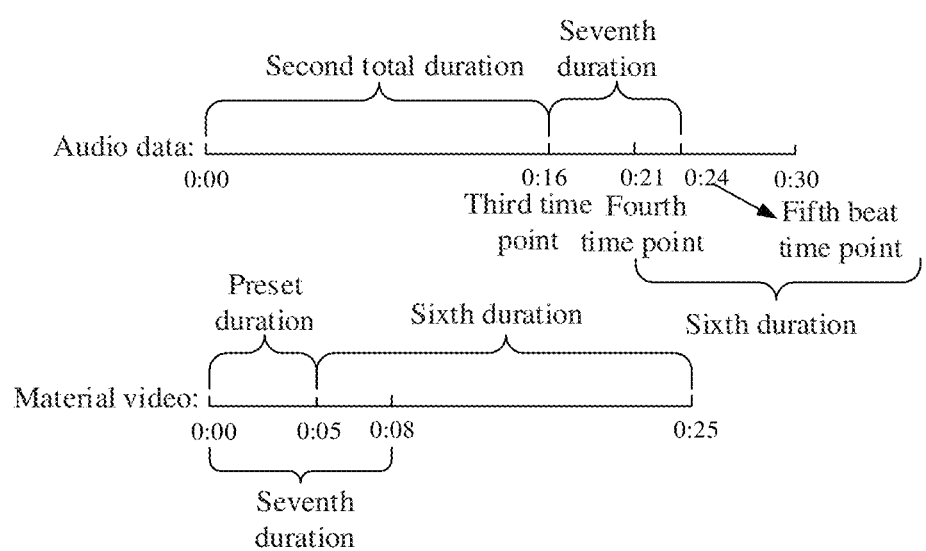
FIG. 9 is a schematic diagram of calculating a duration of a sub-video according to an embodiment of the present disclosure.

In the case that the material video is not the first to be synthesized, a second total duration of the generated sub-video is determined, a third time point of the second total duration upon the start time point of the audio data is determined, and a fourth time point of the preset duration upon the third time point is determined. The total duration of the material video Minus the preset duration is determined as a sixth duration. In the case that at least one fifth beat time point of which a corresponding beat value is the preset value is defined in the sixth time duration upon the fourth time point, the fifth beat time point closest to the fourth time point is determined. A seventh duration from the third time point to the fifth beat time point closest to the fourth time point is determined. In the material video, from the start time point of the material video, a video of the seventh duration is intercepted as a fifth sub-video corresponding to the material video. For example, as shown in FIG. 9, in the case that the duration of the material video is 25 s, the duration of the audio data being 30 s, and the second total duration of the generated sub-video being 16 s, the third time point of the second total duration upon the start time point of the audio data is 0:16, the fourth time point of the preset duration upon the third time point is 0:21, the total duration of the material video minus the preset duration is the six duration of 20 s, and only one fifth beat time point 0:24 of which the corresponding beat value is the preset value is defined in the sixth duration upon the fourth time point, then it is determined that the seventh duration from the third time point to the fifth beat time point is 8 s. In this way, from the start time point of the material video, the video of the seventh duration is intercepted as the fifth sub-video corresponding to the material video, and a duration of the intercepted fifth sub-video is 8 s.

Figure 10:
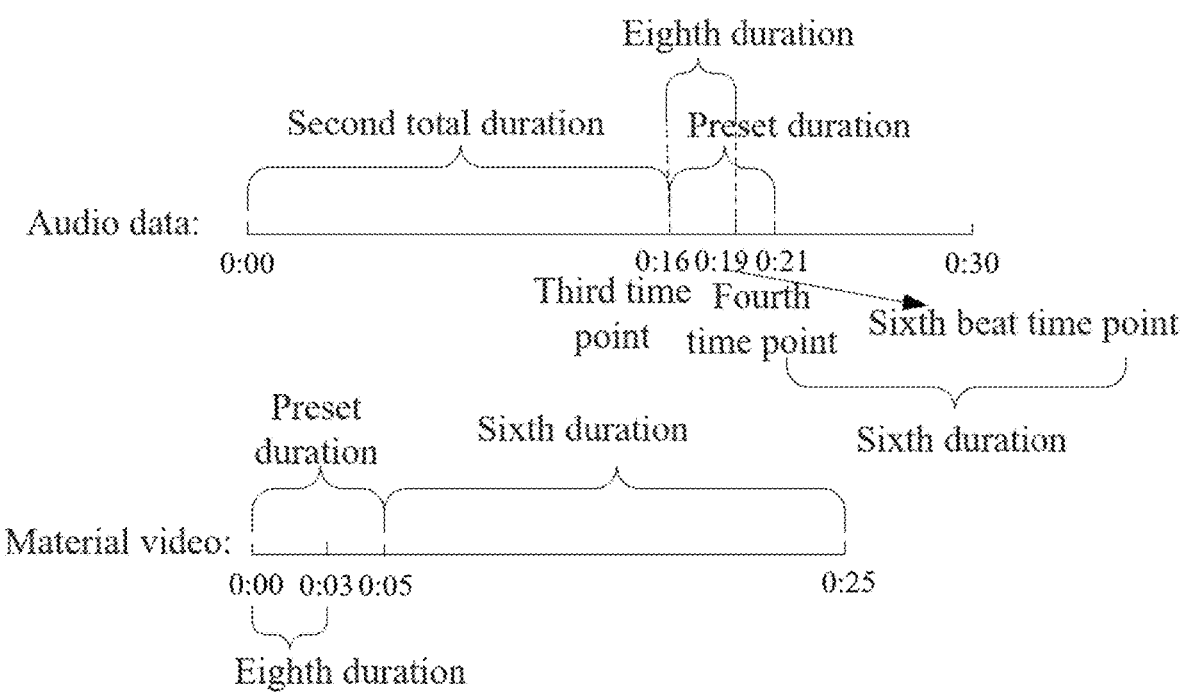
FIG. 10 is a schematic diagram of calculating a duration of a sub-video according to an embodiment of the present disclosure.

In the case that no fifth beat time point of which the corresponding beat value is the preset value is defined in the sixth duration upon the fourth time point, a sixth beat time point which is closest to the fourth time point and of which a corresponding beat value is the preset value is determined between the third time point and the fourth time point, and an eighth duration from the third time point to the sixth beat time point closest to the fourth time point is determined. In the material video, from the start time point of the material video, a video of the eighth duration is intercepted as a sixth sub-video corresponding to the material video. For example, as shown in FIG. 10, in the case that no fifth beat time point of which the corresponding beat value is the preset value is defined in the sixth duration upon the fourth time point, and the sixth beat time point closest to the fourth time point and between the third time point and the fourth time point being 0:19, it is determined that the eighth duration from the third time point to the sixth beat time point is 3 s. In this way, from the start time point of the material video, the video of the eighth duration is intercepted as the sixth sub-video corresponding to the material video, and a duration of the intercepted sixth sub-video is 3 s. It should be noted here that in FIG. 5 to FIG. 10 0:00 of the audio data is the start time point of the audio data, and 0:30 is the end time point of the audio data.

It should be noted that in step 101, in the case that the server sends both manual dotting data and machine dotting data to the terminal, the terminal is to preferentially use the manual dotting data. However, since the manual dotting data may correspond to part of the audio data, the part of the audio data without corresponding dotting data uses the corresponding machine dotting data. Generally, the machine dotting data corresponds to the complete audio data.

During the process of generating the sub-video corresponding to the material image and upon the generation of the corresponding sub-video for each of the material images, the following cases may occur.

Case 1 is a possible case during the process of generating the sub-video corresponding to the material image. Not all the corresponding sub-videos have been generated for the material image, but the required beat time points no longer exist in the remaining audio data. In this case, the following illustration is provided in combination with the above "another possible implementation" of generating the sub-video corresponding to the material image.

In the case that the currently acquired material image is a material picture, and the material picture is not the first to be synthesized, in response to no first beat time point being defined between the first time point and the end time point of the audio data, the audio data is added at the end of the audio data to acquire the added audio data, and in the added audio data, the first beat time point upon the first time point and closest to the first time point is determined.

In the case that the currently acquired material image is a material video, and the material video is not the first to be synthesized, in response to no beat time point of which the corresponding beat value is the preset value being defined upon the above third time point, then the audio data is added at the end of the audio data, and the process of "determining the fourth time point of the preset duration upon the third time point" and subsequently generating the sub-video is performed.

Case 2 is a possible case in response to determining the sub-video corresponding to each of the material images. A total duration of the sub-videos is smaller than the duration of the audio data, and then the following process may be performed.

In the case that the total duration of each of the determined sub-videos is less than the duration of the audio data, the material images are reacquired one by one based on the synthesis sequence of the material images, and each time one material image is acquired, based on the currently acquired material image and the dotting data, the sub-video corresponding to the currently acquired material image is determined.

In some embodiments, for a better user experience, in this case, it can be specified in the embodiment that the sub-video corresponding to each of the material images requires to appear at least twice. In the process of repeating the sub-video, in the case that no beat time points satisfying conditions exist in the remaining music data, the process in case 1 may be performed, which is not repeated herein.

Figure 11:
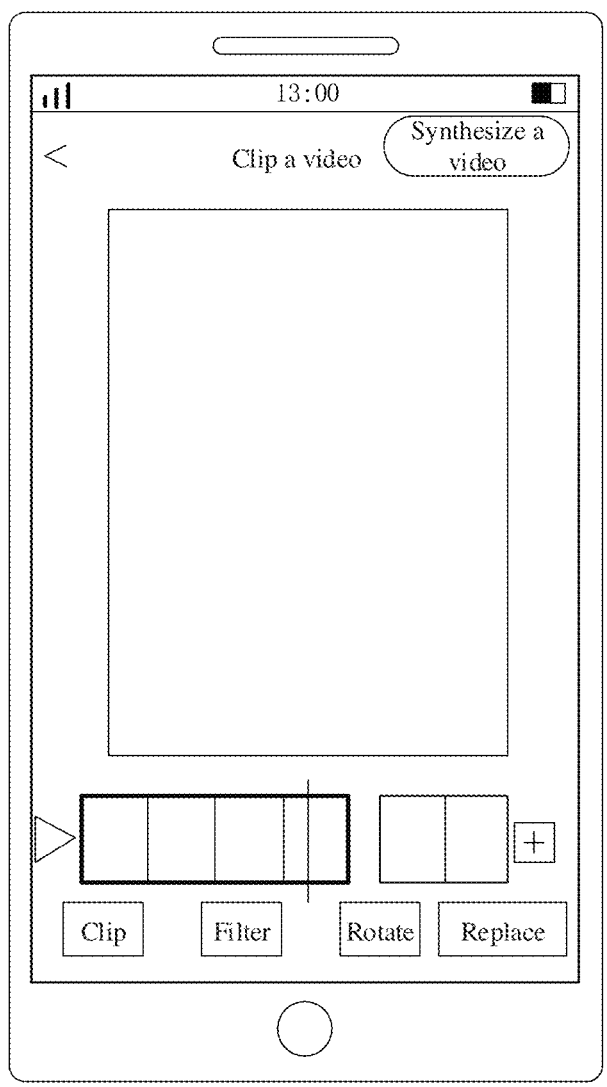
FIG. 11 is a schematic diagram of an interface of an application program according to an embodiment of the present disclosure.

In the case that the sub-video corresponding to each of the material images is generated, in order to satisfy the needs of the user to a greater extent, the application program for synthesizing a video installed on the terminal may also provide the user with a video preview interface. The user may replace the material images and clip the sub-video and the like at the video preview interface, In the interface shown in FIG. 11, multiple preview boxes are disposed at the bottom, and each of the preview boxes may display multiple video frames in one sub-video. Due to a limited screen space, not all the preview boxes of the sub-videos can be displayed simultaneously. The user may slide the preview box by a sliding operation to see the preview boxes not displayed. The user may select one of the preview boxes, which indicates that the user is about to process the sub-video corresponding to the preview box. Multiple functional options, such as clipping and replacing shown in FIG. 11, and filtering and flipping, may be displayed under the preview boxes.

In the case that the user selects the option of clipping function, the sub-video may be clipped to the duration required by the user. There is also an option of synthesizing a video at the upper right corner of the interface shown in FIG. 11. In the case that the sub-video is clipped, the user may click the option of synthesizing video, and then the process of "acquiring the material images one by one, and determining the sub-video corresponding to the acquired material image based on the currently acquired material image and the dotting data each time one material image is acquired" may be re-performed. Here, the material image corresponding to the clipped sub-video may be taken as the clipped sub-video, and in the case that the process of generating the sub-video is performed on the material image, the clipped sub-video may be directly configured as the sub-video corresponding to the material image without being processing.

In the case that the option of replacing function is selected, the user may enter an interface of selecting and replacing the material image, select the material image to be replaced, and trigger a replace instruction corresponding to the material image. In response to receiving the replace instruction for the material image, the terminal replaces the material image corresponding to a target sub-video with the material image corresponding to the replacement instruction for the material image. Then, the related process of "determining the sub-video corresponding to each of the material images based on the synthesis sequence of the material images, the dotting data and each of the material images" in step 103 is performed, and the difference is that for this execution, the material image is the replaced material image.

All the above optional technical solutions may be combined in any way to form an optional embodiment of the present disclosure, which is not repeated herein.

In the embodiment of the present disclosure, firstly, the audio data and the dotting data of the audio data are acquired, and the dotting data here may include the beat time point and the beat value corresponding to the beat time point in the acquired audio data. Then, the plurality of material images are acquired from a local source. The material images and the audio data are synthesized to acquire the synthesized video based on the dotting data, such that the switching time point corresponding to each of the material images of the synthesized video can be the beat time point in the audio data. In this way, in the case that the synthesized video is played, the part of video corresponding to each of the material images in the synthesized video is to be switched in the case that the music is played to the beat time point of a music material. It can be seen that in the synthesized video acquired by the method, the material images can be effectively combined with the music, and higher playability and interest are achieved.

Figure 12:
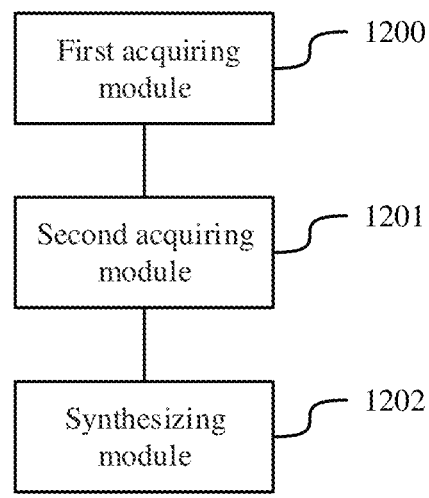
FIG. 12 is a schematic structural diagram of an apparatus for synthesizing a video according to an embodiment of the present disclosure.

Based on the same technical concept, the embodiment of the present invention also provides an apparatus for synthesizing a video. The apparatus may be the terminal in the above embodiment. As shown in FIG. 12, the apparatus includes a first acquiring module 1200, a second acquiring module 1201, and a synthesizing module 1202.

The first acquiring module 1200 is configured to acquire audio data and dotting data corresponding to the audio data, wherein the dotting data includes a beat time point and a beat value corresponding to the beat time point in the audio data.

The second acquiring module 1201 is configured to acquire a plurality of material images from a local source.

The synthesizing module 1202 is configured to synthesize, based on the dotting data, the plurality of material images and the audio data to acquire a synthesized video, wherein a switching time point of each of the material images in the synthesized video is the beat time point in the audio data.

Optionally, the synthesizing module 1202 is configured to:
determine a synthesis sequence of the material images during video synthesizing;
determine, based on the synthesis sequence of the material images, the dotting data and the material images, a sub-video corresponding to each of the material images; and
synthesize, based on the synthesis sequence, each of the sub-videos to acquire synthesized image data, and synthesize the synthesized image data and the audio data to acquire the synthesized video.

Optionally, the synthesizing module 1202 is configured to:
acquire, based on the synthesis sequence of the material images, the material images one by one, and each time one material image is acquired, determine, based on the currently acquired material image and the dotting data, the sub-video corresponding to the currently acquired material image.

Optionally, the synthesizing module 1202 is configured to:
- in response to the currently acquired material image being a material picture and the material picture being the first to be synthesized, determine a first duration from a start time point of the audio data to a first beat time point of the audio data, and generate, based on the material picture and the first duration, a first sub-video corresponding to the material picture, wherein all video frames in the first sub-video are the material picture; and
- in response to the material pictures being not the first to be synthesized, determine a first total duration of the generated sub-video, determine a first time point of the first total duration upon the start time point of the audio data, determine a first beat time point upon the first time point and closest to the first time point, determine a second duration from the first time point to the first beat time point, and generate, based on the material picture and the second duration, a second sub-video corresponding to the material picture, wherein all video frames in the second sub-video are the material picture.

Optionally, the synthesizing module 1202 is configured to:
- in response to no first beat time point being defined between the first time point and an end time point of the audio data, add the audio data at the end of the audio data to acquire the added audio data, and determine, in the added audio data, the first beat time point upon the first time point and closest, to the first time point.

Optionally, the synthesizing module 1202 is configured to:
- in response to the currently acquired material image being a material video and the material video being the first to be synthesized, determine a second time point of a preset duration upon the start time point of the audio data, and determine a total duration of the material video minus the preset duration as a third duration; in response to at least one third beat time point of which a corresponding beat value is a preset value being defined in the third duration upon the second time point, determine the third beat time point closest to the second time point, determine a fourth duration from the start time point of the audio data to the third beat, time point closest to the second time point, and intercept, in the material video, a video of the fourth duration from the start time point of the material video as a third sub-video corresponding to the material video; and in response to no third beat time point of which the corresponding beat value is the preset value being defined in the third duration upon the second time point, determine a fourth beat time point which is closest to the second time point and of which a corresponding beat value is the preset value between the start time point of the audio data and the second time point, determine a fifth duration from the start time point of the audio data to the fourth beat time point, and intercept, in the material video, a video of the fifth duration from the start time point of the material video as a fourth sub-video corresponding to the material video; and
- in response to the material video being not the first to be synthesized, determine a second total duration of the generated sub-video, determine a third time point of the second total duration upon the start time point of the audio data, determine a fourth time point of the preset duration upon the third time point, and determine the total duration of the material video minus the preset duration as a sixth duration; in response to at least one fifth beat, time point of which a corresponding beat value is the preset value being defined in the sixth duration upon the fourth time point, determine the fifth beat time point closest, to the fourth time point, determine a seventh duration from the third time point to the fifth beat time point closest to the fourth time point, and intercept, in the material video, a video of the seventh duration from the start time point of the material video as a fifth sub-video corresponding to the material video; and in response to no fifth beat time point of which the corresponding beat value is the preset value being defined in the sixth duration upon the fourth time point, determine a sixth beat time point which is closest to the fourth time point and of which a corresponding beat value is the preset value between the third time point and the fourth time point, determine an eighth duration from the third time point to the sixth beat time point closest to the fourth time point, and intercept, in the material video, a video of the eighth duration from the start time point of the material video as a sixth sub-video corresponding to the material video.

Optionally, the apparatus further includes:
- an adding module, configured to, in response to no beat time point of which the corresponding beat value is the preset value being defined upon the third time point, add the audio data to the end of the audio data, determine the fourth time point of the preset duration upon the third time point, and determine the total duration of the material video minus the preset duration as the six duration; in response to at least one fifth beat time point of which the corresponding beat value is the preset value being defined in the sixth duration upon the fourth time point, determine the fifth beat time point closest to the fourth time point, determine the seventh duration from the third time point to the fifth beat time point closest to the fourth time point, and intercept, in the material video, the video of the seventh duration from the start time point of the material video as the fifth sub-video corresponding to the material video; and in response to no fifth beat time point of which the corresponding beat value is the preset value being defined in the sixth duration upon the fourth time point, determine the sixth beat time point which is closest to the fourth time point and of which the corresponding beat value is the preset value before the fourth time point, determine the eighth duration from the third time point to the sixth beat time point closest to the fourth time point, and intercept, in the material video, the video of the eighth duration from the start time point of the material video as the sixth sub-video corresponding to the material video.

Optionally, the apparatus further includes:
- a clipping module, configured to determine, in response to the currently acquired material image being a clipped video, the material video as a corresponding seventh sub-video.

Optionally, the first acquiring module 1201 is configured to:
- acquire original audio data and a preset clipping time point; and
- clip, based on the preset clipping time point, the original audio data to acquire the audio data for synthesizing a video.

Optionally, the first acquiring module 1201 is configured to:

acquire the original audio data; and receive an audio clip instruction, and clip, based on the audio dip instruction, the original audio data to acquire the audio data for synthesizing a video.

Optionally, the apparatus further includes:

a replacing module, in response to a material image replace instruction, configured to replace, based on the material images corresponding to the material image replace instruction, the material image corresponding to a target sub-video; and determine, based on the synthesis sequence of the replaced material images, the dotting data and each of the replaced material images, the sub-video corresponding to each of the replaced material images.

Optionally, the apparatus further includes:

a third acquiring module, configured to reacquire, in response to a total duration of the determined sub-videos being less than a duration of the audio data, the material images one by one based on the synthesis sequence of the material images, and each time one material image is acquired, determine, based on the currently acquired material image and the dotting data, the sub-video corresponding to the currently acquired material image.

It should be noted that the apparatus for synthesizing the video according to the above embodiment is only illustrated by the division of each of the above functional modules in the case that video synthesis is performed. In actual application, the above functions may be allocated to different functional modules according to actual needs, that is, an internal structure of the terminal is divided into different functional modules to complete all or part of the functions described above. In addition, the apparatus for synthesizing a video and the method for synthesizing a video according to the above embodiments belong to the same concept, and the specific implementation process thereof is detailed in the embodiment of the method, which is not repeated herein.

Figure 13:
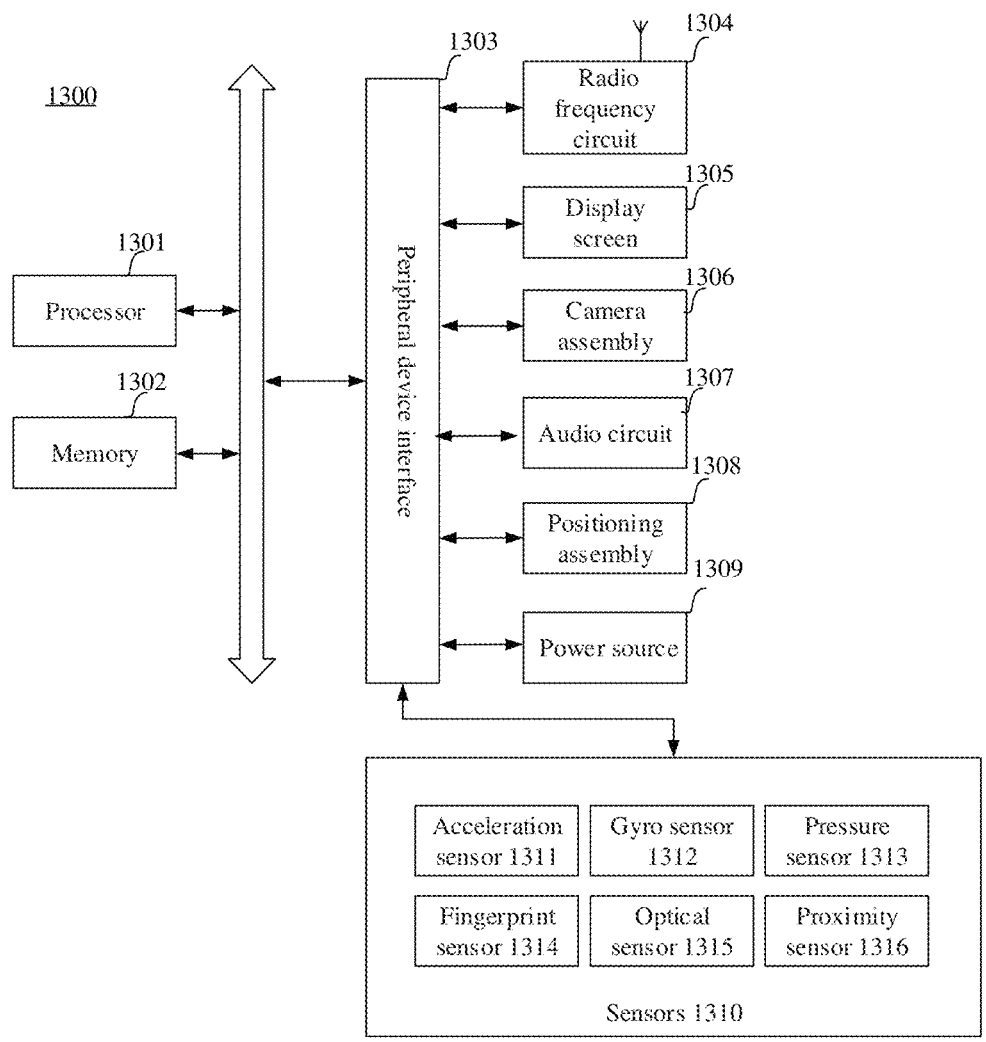
FIG. 13 is a schematic structural diagram of a terminal according to an embodiment of the present disclosure.

FIG. 13 is a structural block diagram of a terminal 1300 according to an exemplary embodiment of the present disclosure. The terminal 1300 may be a smart phone, a tablet computer, a Moving Picture Experts Group Audio Layer III (MP3), a Moving Picture Experts Group Audio Layer IV (MP4), a laptop or a desk computer. The terminal 1300 may also be referred to as user equipment, a portable terminal, a laptop terminal, a desk terminal, or the like.

Generally, the terminal 1300 includes a processor 1301 and a memory 1302.

The processor 1301 may include one or more processing cores, such as a 4-core processor and an 8-core processor. The processor 1301 may be formed by at least one hardware of a digital signal processor (DSP), a field-programmable gate array (FPGA), and a programmable logic array (PLA). The processor 1301 may also include a main processor and a coprocessor. The main processor is a processor for processing the data in a wake-up state, and is also referred to as a central processing unit (CPU). The coprocessor is a to processor for processing the data in a standby state. In some embodiments, the processor 1301 may be integrated with a graphics processing unit (GPU), which is configured to render and draw the content to be displayed by a display screen. In some embodiments, the processor 1301 may also include an Artificial Intelligence (AI) processor configured to perform computational operations related to machine learning.

The memory 1302 may include one or more computer-readable storage mediums, which can be non-transitory. The memory 1302 may also include a high-speed random access memory, as well as a non-volatile memory, such as one or more disk storage devices and flash storage devices. In some embodiments, the non-transitory computer-readable storage medium in the memory 1302 is configured to store at least one instruction. The at least one instruction, when loaded and executed by the processor 1301, causes the processor 1301 to perform the method for synthesizing the video according to the method embodiment of the present disclosure.

In some embodiments, the terminal 1300 may further include a peripheral device interface 1303 and at least one peripheral device. The processor 1301, the memory 1302, and the peripheral device interface 1303 may be connected by a bus or a signal line. Each of the peripheral devices may be connected to the peripheral device interface 1303 by a bus, a signal line or a circuit board. Specifically, the peripheral device includes at least one of a radio frequency circuit 1304, a touch display screen 1305, a camera 1306, an audio circuit 1307, a positioning assembly 1308, and a power source 1309.

The peripheral device interface 1303 may be configured to connect at least one peripheral device associated with an input/output (I/O) to the processor 1301 and the memory 1302. In some embodiments, the processor 1301, the memory 1302 and the peripheral device interface 1303 are integrated on the same chip or circuit board. In some other embodiments, any one or two of the processor 1301, the memory 1302 and the peripheral device interface 1303 may be implemented on a separate chip or circuit board, which is not limited in the present embodiment.

The radio frequency circuit 1304 is configured to receive and transmit a radio frequency (RF) signal, which is also referred to as an electromagnetic signal. The radio frequency circuit 1304 communicates with a communication network and other communication devices via the electromagnetic signal. The radio frequency circuit 1304 converts the electrical signal into the electromagnetic signal for transmission, or converts the received electromagnetic signal into the electrical signal. Optionally, the radio frequency circuit 1304 includes an antenna system, an RF transceiver, one or more amplifiers, a tuner, an oscillator, a digital signal processor, a codec chipset, a user identity module card, and the like. The radio frequency circuit 1304 may communicate with other terminals via at least one wireless communication protocol. The wireless communication protocol includes, but not limited to, a metropolitan area network, various generations of mobile communication networks (2G, 3G, 4G, and 5G), a wireless local area network, and/or a wireless fidelity (Wi-Fi) network. In some embodiments, the RF circuit 1304 may also include a circuit related to near-field communication (NFC), which is not limited in the present disclosure.

The display screen 1305 is configured to display a user interface (UI). The UI may include graphics, text, icons, videos, and any combination thereof. In the case that the display screen 1305 is a touch display screen, the display screen 1305 is further capable of acquiring touch signals on or over the surface of the display screen 1305. The touch signal may be input into the processor 1301 as a control signal for processing. At this point, the display screen 1305 may also be configured to provide virtual buttons and/or virtual keyboards, which are also referred to as soft buttons and/or soft keyboards. In some embodiments, one display screen 1305 may be disposed on the front panel of the terminal 1300. In some other embodiments, at least two display screens 1305 may be disposed on different surfaces of the terminal 1300 or in a folded design. In some further embodiments, the display screen 1305 may be a flexible display screen disposed on the curved or folded surface of the terminal 1300. Even the display screen 1305 may have an irregular shape other than a rectangle; that is, the display screen 1305 may be an irregular-shaped screen. The display screen 1305 may further be prepared from a material such as a liquid crystal display (LCD) and an organic light-emitting diode (OLED).

The camera assembly 1306 is configured to capture images or videos. Optionally, the camera assembly 1306 includes a front camera and a rear camera. Typically, the front camera is disposed on the front panel of the terminal, and the rear camera is disposed on the back of the terminal. In some embodiments, at least two rear cameras are disposed, and are at least one of a main camera, a depth-of-field camera, a wide-angle camera, and a telephoto camera, so as to realize the fusion of the main camera and the depth-of-field camera for background blurring function, the fusion of the main camera and the wide-angle camera for panoramic shooting and virtual reality (VR) shooting functions, or other fusion shooting functions. In some embodiments, the camera assembly 1306 may also include a flashlight. The flashlight may be a single-color temperature flashlight or a dual-color temperature flashlight. The dual-color temperature flash is a combination of a warm flashlight and a cold flashlight and can be used for light compensation at different color temperatures.

The audio circuit 1307 may include a microphone and a speaker. The microphone is configured to collect sound waves of users and environments, and convert the sound waves into electrical signals which are input into the processor 1301 for processing, or input into the RF circuit 1304 for voice communication. For the purpose of stereo acquisition or noise reduction, there may be a plurality of microphones disposed at different locations of the terminal 1300. The microphone may also be an array microphone or an omnidirectional acquisition microphone. The speaker is configured to convert the electrical signals from the processor 1301 or the radio frequency circuit 1304 into the sound waves. The speaker may be a conventional film speaker or a piezoelectric ceramic speaker. In the case that the speaker is the piezoelectric ceramic speaker, the electrical signal may be converted into not only the sound waves that can be heard by humans, but also the sound waves that cannot be heard by humans for the purpose of ranging and the like. In some embodiments, the audio circuit 1307 may also include a headphone jack.

The positioning assembly 1308 is configured to locate the current geographic location of the terminal 1300 to implement navigation or a location based service (LBS). The positioning assembly 1308 may be the United States' Global Positioning System (GPS), Russia's Global Navigation Satellite System (GLONASS), China's BeiDou Navigation Satellite System (BDS), and the European Union's Galileo Satellite Navigation System (Galileo), The power source 1309 is configured to supply power to various assemblies in the terminal 1300. The power source 1309 may be alternating current, direct current, a disposable battery, or a rechargeable battery. In the case that the power source 1309 includes the rechargeable battery, the rechargeable battery may support wired charging or wireless charging. The rechargeable battery may also support the fast charging technology.

In some embodiments, the terminal 1300 also includes one or more sensors 1310. The one or more sensors 1310 include, but not limited to, an acceleration sensor 1311, a gyro sensor 1312, a pressure sensor 1313, a fingerprint sensor 1314, an optical sensor 1315 and a proximity sensor 1316.

The acceleration sensor 1311 may detect magnitudes of accelerations on three coordinate axes of a coordinate system established by the terminal 1300. For example, the acceleration sensor 1311 may be configured to detect components of a gravitational acceleration on the three coordinate axes. The processor 1301 may control the touch display screen 1305 to display a user interface in a landscape view or a portrait view according to a gravity acceleration signal collected by the acceleration sensor 1311. The acceleration sensor 1311 may also be configured to collect motion data of a game or a user.

The gyro sensor 1312 can detect an orientation and a rotation angle of the body of the terminal 1300, and can cooperate with the acceleration sensor 1311 to collect a 3D motion of the user to the terminal 1300. Based on the data collected by the gyro sensor 1312, the processor 1301 can implement the following functions: motion sensing (e.g., changing the UI according to a user's tilt operation), image stabilization during shooting, game control and inertial navigation.

The pressure sensor 1313 may be disposed on a side frame of the terminal 1300 and/or a lower layer of the touch display screen 1305. In the case that the pressure sensor 1313 is disposed on the side frame of the terminal 1300, a user's holding signal to the terminal 1300 may be detected. The processor 1301 may perform left-right hand recognition or shortcut operation according to the holding signal collected by the pressure sensor 1313, In the case that the pressure sensor 1313 is disposed on the lower layer of the touch display screen 1305, the processor 1301 controls an operable control on the UI according to a user's pressure operation on the touch display screen 1305. The operable control includes at least one of a button control, a scroll bar control, an icon control and a menu control.

The fingerprint sensor 1314 is configured to collect a user's fingerprint. The processor 1301 identifies the user's identity based on the fingerprint collected by the fingerprint sensor 1314, or the fingerprint sensor 1314 identifies the user's identity based on the collected fingerprint. In the case that the user's identity is identified as trusted, the processor 1301 authorizes the user to perform related sensitive operations, which include unlocking the screen, viewing encrypted information, downloading software, paying, and changing settings. The fingerprint sensor 1314 may be disposed on the front, back, or side of the terminal 1300. In the case that the terminal 1300 includes a physical button or a manufacturer's logo, the fingerprint sensor 1314 may be integrated with the physical button or the manufacturer's logo.

The optical sensor 1315 is configured to collect the intensity of ambient light. In one embodiment, the processor 1301 may control the display brightness of the touch display screen 1305 according to the intensity of ambient light collected by the optical sensor 1315. Specifically, in the case that the intensity of ambient light is high, the display brightness of the touch display screen 1305 is increased, and in the case that the intensity of ambient light is low, the display brightness of the touch display screen 1305 is decreased. In another embodiment, the processor 1301 may also dynamically adjust shooting parameters of the camera assembly 1306 according to the intensity of ambient light collected by the optical sensor 1315.

The proximity sensor 1316, also referred to as a distance sensor, is typically disposed on the front panel of the terminal 1300. The proximity sensor 1316 is configured to capture a distance between the user and the front surface of the terminal 1300. In one embodiment, in response to the proximity sensor 1316 detecting that the distance between the user and the front surface of the terminal 1300 becomes gradually smaller, the processor 1301 controls the touch display screen 1305 to switch from a screen-on state to a screen-off state. In response to detecting that the distance between the user and the front surface of the terminal 1300 gradually increases, the processor 1301 controls the touch display screen 1305 to switch from the screen-off state to the screen-on state.

It is to be understood by those skilled in the art that the structure shown in FIG. 13 does not constitute a limitation to the terminal 1300, and may include more or fewer assemblies than those illustrated, or a combination of assemblies or adopt different arrangements of assemblies.

In an exemplary embodiment, a computer-readable storage medium is further provided. For example, a memory including an instruction, and the above instruction may be executed by a processor in the terminal to implement the method for synthesizing a video in the above embodiment. The computer-readable storage medium may be non-transitory. For example, the computer-readable storage medium may be a read-only memory (ROM), a random-access memory (RAM), a compact disc read-only memory (CD-ROM), a magnetic disk, a floppy disk, an optical data storage device, or the like.

Those ordinary skilled in the art can understand that all or part of the steps of implementing the above embodiments may be completed by hardware, or may be completed by related hardware instructed by a program, and the program may be stored in a computer-readable storage medium. The above storage medium may be a read-only memory, a magnetic disk, an optical disk or the like.

Described above are merely exemplary embodiments of the present disclosure, and are not intended to limit the present disclosure. Within the spirit and principles of the disclosure, any modifications, equivalent replacements, improvements, and the like should be included within the protection scope of the present disclosure.

What is claimed is:

1. A method for synthesizing a video, comprising:
   acquiring, by a terminal, audio data and dotting data corresponding to the audio data from a server of an application program, wherein the dotting data comprises a beat time point and a beat value corresponding to the beat time point of the audio data, and the application program is installed on the terminal and has a function of making synthesized video;
   acquiring, by the terminal, a plurality of material images from a local source; and
   synthesizing, by the terminal and based on the dotting data, the plurality of material images and the audio data to acquire a synthesized video, wherein a switching time point of each of the material images in the synthesized video is the beat time point of the audio data; and
   wherein synthesizing, based on the dotting data, the plurality of material images and the audio data to acquire the synthesized video comprises:
   determining a synthesis sequence of the material images during video synthesizing;
   determining, based on the synthesis sequence of the material images, the dotting data and the material images, a sub-video corresponding to each of the material images; and
   synthesizing, based on the synthesis sequence, each of the sub-videos to acquire synthesized image data, and synthesizing the synthesized image data and the audio data to acquire the synthesized video;
   wherein determining, based on the synthesis sequence of the material images, the dotting data and the material images, the sub-video corresponding to each of the material images comprises:
   acquiring, based on the synthesis sequence of the material images, the material images one by one, and each time one material image is acquired, determining, based on the currently acquired material image and the dotting data, the sub-video corresponding to the currently acquired material image;
   wherein determining, based on the currently acquired material image and the dotting data, the sub-video corresponding to the currently acquired material image comprises:
   in response to the currently acquired material image being a material video and the material video being the first to be synthesized, determining a second time point of a preset duration upon a start time point of the audio data, and determining a total duration of the material video minus the preset duration as a third duration; in response to at least one third beat time point of which a corresponding beat value is a preset value being defined in the third duration upon the second time point, determining the third beat time point closest to the second time point, determining a fourth duration from the start time point of the audio data to the third beat time point closest to the second time point, and intercepting, in the material video, a video of the fourth duration from the start time point of the material video as a third sub-video corresponding to the material video; and in response to no third beat time point of which the corresponding beat value is the preset value being defined in the third duration upon the second time point, determining a fourth beat time point which is closest to the second time point and of which a corresponding beat value is the preset value between the start time point of the audio data and the second time point, determining a fifth duration from the start time point of the audio data to the fourth beat time point, and intercepting, in the material video, a video of the fifth duration from the start time point of the material video as a fourth sub-video corresponding to the material video; and
   in response to the material video being not the first to be synthesized, determining a second total duration of the generated sub-video, determining a third time point of the second total duration upon the start time point of the audio data, determining a fourth time point of the preset duration upon the third time point, and determining the total duration of the material video minus the preset duration as a sixth duration; in response to at least one fifth beat time point of which a corresponding beat value is the preset value being defined in the sixth duration upon the fourth time point, determining the fifth beat time point closest to the fourth time point, determining a seventh duration from the third time point to the fifth beat time point closest to the fourth time point, and intercepting, in the material video, a video of the seventh duration from the start time point of the material video as a fifth sub-video corresponding to the material video; and in response to no fifth beat time point of which the corresponding beat value is the preset value being defined in the sixth duration upon the fourth time point, determining a sixth beat time point which is closest to the fourth time point and of which a corresponding beat value is the preset value between the third time point and the fourth time point, determining an eighth duration from the third time point to the sixth beat time point closest to the fourth time point, and intercepting, in the material video, a video of the eighth duration from the start time point of the material video as a sixth sub-video corresponding to the material video.

2. The method according to claim 1, wherein determining, based on the currently acquired material image and the dotting data, the sub-video corresponding to the currently acquired material image comprises:
  in response to the currently acquired material image being a material picture and the material picture being the first to be synthesized, determining a first duration from a start time point of the audio data to a first beat time point of the audio data, and generating, based on the material picture and the first duration, a first sub-video corresponding to the material picture, wherein all video frames in the first sub-video are the material picture; and
  in response to the material picture being not the first to be synthesized, determining a first total duration of the generated sub-video, determining a first time point of the first total duration after the start time point of the audio data, determining a first beat time point after the first time point and closest to the first time point, determining a second duration from the first time point to the first beat time point, and generating, based on the material picture and the second duration, a second sub-video corresponding to the material picture, wherein all video frames in the second sub-video are the material picture.

3. The method according to claim 2, wherein determining the first beat time point after the first time point and closest to the first time point comprises:
  in response to no first beat time point being defined between the first time point and an end time point of the audio data, adding another audio data at the end of the audio data to acquire added audio data, and determining, in the added audio data, the first beat time point after the first time point and closest to the first time point.

4. The method according to claim 1, further comprising:
  in response to no beat time point of which the corresponding beat value is the preset value being defined after the third time point, adding another audio data to the end of the audio data determining the fourth time point of the preset duration after the third time point, and determining the total duration of the material video minus the preset duration as the six duration; in response to at least one fifth beat time point of which the corresponding beat value is the preset value being defined in the sixth duration after the fourth time point, determining the fifth beat time point closest to the fourth time point, determining the seventh duration from the third time point to the fifth beat time point closest to the fourth time point, and intercepting, in the material video, the video of the seventh duration from the start time point of the material video as the fifth sub-video corresponding to the material video; and in response to no fifth beat time point of which the corresponding beat value is the preset value being defined in the sixth duration after the fourth time point, determining the sixth beat time point which is closest to the fourth time point and of which the corresponding beat value is the preset value between the third time point and the fourth time point, determining the eighth duration from the third time point to the sixth beat time point closest to the fourth time point, and intercepting, in the material video, the video of the eighth duration from the start time point of the material video as the sixth sub-video corresponding to the material video.

5. The method according to claim 1, further comprising:
  in response to the currently acquired material image being a clipped video, determining the material video as a corresponding seventh sub-video.

6. The method according to claim 1, wherein acquiring the audio data comprises:
  acquiring original audio data and a preset clipping time point; and
  clipping, based on the preset clipping time point, the original audio data to acquire the audio data for synthesizing the video.

7. The method according to claim 1, wherein acquiring the audio data comprises:
  acquiring the original audio data; and
  receiving an audio clip instruction, and clipping, based on the audio clip instruction, the original audio data to acquire the audio data for synthesizing the video.

8. The method according to claim 1, wherein in response to determining, based on the synthesis sequence of the material images, the dotting data and the material images, the sub-video corresponding to each of the material images, the method further comprises:
  in response to a material image replace instruction, replacing, based on material images corresponding to the material image replace instruction, material images corresponding to a target sub-video; and
  determining, based on a synthesis sequence of the replaced material images, the dotting data and each of the replaced material images, a sub-video corresponding to each of the replaced material images.

9. The method according to claim 1, wherein in response to acquiring, based on the synthesis sequence of the material images, the material images one by one, and each time one material image is acquired, determining, based on the currently acquired material image and the dotting data, the sub-video corresponding to the currently acquired material image, the method further comprises:
  reacquiring, in response to a total duration of the determined sub-videos being less than a duration of the audio data, the material images one by one based on the synthesis sequence of the material images, and each time one material image is acquired, determining, based on the currently acquired material image and the dotting data, the sub-video corresponding to the currently acquired material image.

10. A terminal comprising a processor and a memory configured to store at least one instruction, wherein the processor, when loading and executing the at least one instruction, is caused to perform a method for synthesizing the video, the method comprising:
  acquiring, by the terminal, audio data and dotting data corresponding to the audio data, from a server of an application program, wherein the dotting data comprises a beat time point and a beat value corresponding to the beat time point of the audio data; and the application program is installed on the terminal and has a function of making synthesized video;

acquiring, by the terminal, a plurality of material images from a local source; and synthesizing, by the terminal and based on the dotting data, the plurality of material images and the audio data to acquire a synthesized video, wherein a switching time point of each of the material images in the synthesized video is the beat time point of the audio data; and wherein synthesizing, based on the dotting data, the plurality of material images and the audio data to acquire the synthesized video comprises:

determining a synthesis sequence of the material images during video synthesizing;

determining, based on the synthesis sequence of the material images, the dotting data and the material images, a sub-video corresponding to each of the material images; and synthesizing, based on the synthesis sequence, each of the sub-videos to acquire synthesized image data, and synthesizing the synthesized image data and the audio data to acquire the synthesized video;

wherein determining, based on the synthesis sequence of the material images, the dotting data and the material images, the sub-video corresponding to each of the material images comprises:

acquiring, based on the synthesis sequence of the material images, the material images one by one, and each time one material image is acquired, determining, based on the currently acquired material image and the dotting data, the sub-video corresponding to the currently acquired material image;

wherein determining, based on the currently acquired material image and the dotting data, the sub-video corresponding to the currently acquired material image comprises:

in response to the currently acquired material image being a material video and the material video being the first to be synthesized, determining a second time point of a preset duration after a start time point of the audio data, and determining a total duration of the material video minus the preset duration as a third duration; in response to the at least one third beat time point of which a corresponding beat value is a preset value being defined in the third duration upon the second time point, determining the third beat time point closest to the second time point, determining a fourth duration from the start point of the audio data to the third beat time point closest to the second time point, and intercepting, in the material video, a video of the fourth duration from the start time point of the material video as a third sub-video corresponding to the material video; and in response to no third beat time point of which the corresponding beat value is the preset value being defined in the third duration after the second time point, determining a fourth beat time point which is closest to the second time point and of which a corresponding beat value is the preset value between the start time point of the audio data and the second time point, determining a fifth duration from the start time point of the audio data to the fourth beat time point, and intercepting, in the material video, a video of the fifth duration from the start time point of the material video as a fourth sub-video corresponding to the material video; and in response to the material video being not the first to be synthesized, determining a second total duration of a generated sub-video, determining a third time point of the second total duration after the start time point of the audio data, determining a fourth time point of the preset duration after the third time point, and determining the total duration of the material video minus the preset duration as a sixth duration; in response to at least one fifth beat time point of which a corresponding beat value is the preset value being defined in the sixth duration after the fourth time point, determining the fifth beat time point closest to the fourth time point, determining a seventh duration from the third time point to the fifth beat time point closest to the fourth time point, and intercepting, in the material video, a video of the seventh duration from the start time point of the material video as a fifth sub-video corresponding to the material video; and in response to no fifth beat time point of which the corresponding beat value is the preset value being defined in the sixth duration after the fourth time point, determining a sixth beat time point which is closest to the fourth time point and of which a corresponding beat value is the preset value between the third time point and the fourth time point, determining an eighth duration from the third time point to the sixth beat time point closest to the fourth time point, and intercepting, in the material video, a video of the eighth duration from the start time point of the material video as a sixth sub-video corresponding to the material video.

11. The terminal according to claim 10, wherein determining, based on the currently acquired material image and the dotting data, the sub-video corresponding to the currently acquired material image comprises:

in response to the currently acquired material image being a material picture and the material picture being the first to be synthesized, determining a first duration from a start time point of the audio data to a first beat time point of the audio data, and generating, based on the material picture and the first duration, a first sub-video corresponding to the material picture, wherein all video frames in the first sub-video are the material picture; and in response to the material picture being not the first to be synthesized, determining a first total duration of the generated sub-video, determining a first time point of the first total duration after the start time point of the audio data, determining a first beat time point after the first time point and closest to the first time point, determining a second duration from the first time point to the first beat time point, and generating, based on the material picture and the second duration, a second sub-video corresponding to the material picture, wherein all video frames in the second sub-video are the material picture.

12. The terminal according to claim 11, wherein determining the first beat time point after the first time point and closest to the first time point comprises:

in response to no first beat time point being defined between the first time point and an end time point of the audio data, adding another audio data at the end of the audio data to acquire added audio data, and determining, in the added audio data, the first beat time point after the first time point and closest to the first time point.

13. The terminal according to claim 10, wherein acquiring the audio data comprises:
   acquiring original audio data and a preset clipping time point; and
   clipping, based on the preset clipping time point, the original audio data to acquire the audio data for synthesizing the video.

14. The terminal according to claim 10, wherein acquiring the audio data comprises:
   acquiring original audio data; and
   receiving an audio clip instruction, and clipping, based on the audio clip instruction, the original audio data to acquire the audio data for synthesizing the video.

15. A non-transitory computer-readable storage medium storing at least one instruction therein, wherein the at least one instruction is loaded and executed by a processor to perform a method for synthesizing the video, the method comprising:
   acquiring, by a terminal, audio data and dotting data corresponding to the audio data from a server of an application program, wherein the dotting data comprises a beat time point and a beat value corresponding to the beat time point of the audio data, and the application program is installed on the terminal and has a function of making synthesized video;
   acquiring, by the terminal, a plurality of material images from a local source; and
   synthesizing, by the terminal and based on the dotting data, the plurality of material images and the audio data to acquire a synthesized video, wherein a switching time point of each of the material images in the synthesized video is the beat time point of the audio data; and
   wherein synthesizing, based on the dotting data, the plurality of material images and the audio data to acquire the synthesized video comprises:
      determining a synthesis sequence of the material images during video synthesizing;
      determining, based on the synthesis sequence of the material images, the dotting data and the material images, a sub-video corresponding to each of the material images; and
      synthesizing, based on the synthesis sequence, each of the sub-videos to acquire synthesized image data, and synthesizing the synthesized image data and the audio data to acquire the synthesized video;
   wherein determining, based on the synthesis sequence of the material images, the dotting data and the material images, the sub-video corresponding to each of the material images comprises:
      acquiring, based on the synthesis sequence of the material images, the material images one by one, and each time one material image is acquired, determining, based on the currently acquired material image and the dotting data, a sub-video corresponding to the currently acquired material image;
   wherein determining, based on the currently acquired material image and the dotting data, the sub-video corresponding to the currently acquired material image comprises:

in response to the currently acquired material image being a material video and the material video being the first to be synthesized, determining a second time point of a preset duration after a start time point of the audio data, and determining a total duration of the material video minus the preset duration as a third duration; in response to at least one third beat time point of which a corresponding beat value is a preset value being defined in the third duration upon the second time point, determining the third beat time point closest to the second time point, determining a fourth duration from the start time point of the audio data to the third beat time point closest to the second time point, and interception, in the material video, a video of the fourth duration from the start time pint of the material video as a third sub-video corresponding to the material video; and in response to no third beat time point of which the corresponding beat value is the preset value being defined in the third duration after the second time point, determining a fourth beat time point which is closest to the second time point and of which a corresponding beat value is the preset value between the start time point of the audio data and the second time point, determining a fifth duration from the start time point of the audio data to the fourth beat time point, and intercepting, in the material video, a video of the fifth duration from the start time point of the material video as a fourth sub-video corresponding to the material video; and in response to the material video being not the first to be synthesized, determining a second total duration of a generated sub-video, determining a third time point of the second total duration after the start time point of the audio data, determining a fourth time point of the preset duration after the third time point, and determining the total duration of the material video minus the preset duration as a sixth duration; in response to at least one fifth beat time point of which a corresponding beat value is the preset value being defined in the sixth duration after the fourth time point, determining the fifth beat time point closest to the fourth time point, determining a seventh duration from the third time point to the fifth beat time point closest to the fourth time point, and intercepting, in the material video, a video of the seventh duration from the start time point of the material video as a fifth sub-video corresponding to the material video; and in response to no fifth beat time point of which the corresponding beat value is the preset value being defined in the sixth duration after the fourth time point, determining a sixth beat time point which is closest to the fourth time point and of which a corresponding beat value is the preset value between the third time point and the fourth time point, determining an eighth duration from the third time point to the sixth beat time point closest to the fourth time point, and intercepting, in the material video, a video of the eighth duration from the start time point of the material video as a sixth sub-video corresponding to the material video.

* * * * *

UNITED STATES PATENT AND TRADEMARK OFFICE
CERTIFICATE OF CORRECTION

| | |
|---|---|
| PATENT NO. | : 12,223,936 B2 |
| APPLICATION NO. | : 17/593238 |
| DATED | : February 11, 2025 |
| INVENTOR(S) | : Han Wu et al. |

It is certified that error appears in the above-identified patent and that said Letters Patent is hereby corrected as shown below:

In the Specification

Column 3, Line 3, delete "third beat, time" and insert -- third beat time --.

Column 3, Line 56, delete "fifth beat, time" and insert -- fifth beat time --.

Column 4, Line 18, delete "preset dipping time" and insert -- preset clipping time --.

Column 4, Line 56, delete "and clotting data" and insert -- and dotting data --.

Column 5, Line 10, delete "and synthesize, the" and insert -- and synthesize the --.

Column 5, Line 64, delete "of Which the" and insert -- of which the --.

Column 6, Line 24, delete "fifth beat, time" and insert -- fifth beat time --.

Column 6, Line 32, delete "point with is" and insert -- point which is --.

Column 10, Line 29, delete "as follows," and insert -- as follows. --.

Column 10, Line 50, delete "audio dip instruction," and insert -- audio clip instruction, --.

Column 13, Line 51, delete "video Minus the" and insert -- video minus the --.

Column 14, Line 33, delete "FIG. 10 0:00" and insert -- FIG. 10, 0:00 --.

Column 15, Line 32, delete "preview interface, In" and insert -- preview interface. In --.

Column 17, Line 30, delete "and closest, to" and insert -- and closest to --.

Signed and Sealed this
Seventeenth Day of June, 2025

Coke Morgan Stewart
*Acting Director of the United States Patent and Trademark Office*

CERTIFICATE OF CORRECTION (continued)
U.S. Pat. No. 12,223,936 B2

Column 17, Line 44, delete "third beat, time" and insert -- third beat time --.

Column 18, Line 3, delete "fifth beat, time" and insert -- fifth beat time --.

Column 18, Line 6, delete "point closest, to" and insert -- point closest to --.

Column 19, Line 5 (approx.), delete "audio dip instruction," and insert -- audio clip instruction, --.

Column 19, Lines 59 and 60, delete "a to processor" and insert -- a low-power-consumption processor --.

Column 21, Line 57, delete "System (Galileo)," and insert -- System (Galileo). --.

Column 22, Line 33, delete "sensor 1313, In" and insert -- sensor 1313. In --.

In the Claims

Column 24, Claim 1, Line 19, delete "data, the sub" and insert -- data, a sub --.

Column 24, Claim 1, Line 28, delete "duration upon a" and insert -- duration after a --.

Column 24, Claim 1, Line 44, delete "duration upon the" and insert -- duration after the --.

Column 24, Claim 1, Line 56, delete "of the generated" and insert -- of a generated --.

Column 24, Claim 1, Line 58, delete "duration upon the" and insert -- duration after the --.

Column 24, Claim 1, Line 60, delete "duration upon the" and insert -- duration after the --.

Column 24, Claim 1, Line 65, delete "duration upon the" and insert -- duration after the --.

Column 25, Claim 1, Line 7, delete "duration upon the" and insert -- duration after the --.

Column 25, Claim 4, Line 57, delete "audio data determining" and insert -- audio data, determining --.

Column 26, Claim 7, Line 29, delete "acquiring the original audio" and insert -- acquiring original audio --.

Column 26, Claim 10, Line 67, delete "audio data, from" and insert -- audio data from --.

Column 27, Claim 10, Line 3, delete "audio data; and" and insert -- audio data, and --.

Column 27, Claim 10, Line 35, delete "data, the sub-video" and insert -- data, a sub-video --.

Column 27, Claim 10, Line 47, delete "to the at least" and insert -- to at least --.

Column 27, Claim 10, Line 52, delete "the start point" and insert -- the start time point --.

Column 30, Claim 15, Line 14 (approx.), delete "and interception, in" and insert -- and intercepting, in --.

Column 30, Claim 15, Line 16 (approx.), delete "time pint of" and insert -- time point of --.